United States Patent [19]

Uemura et al.

[11] Patent Number: 4,737,421
[45] Date of Patent: Apr. 12, 1988

[54] METHOD FOR PRODUCING A CARBON SHEET AND A FUEL CELL SEPARATOR

[75] Inventors: Takeo Uemura; Shigeru Murakami, both of Omachi, Japan

[73] Assignee: Showa Denko Kabushiki Kaisha, Tokyo, Japan

[21] Appl. No.: 19,165

[22] Filed: Feb. 26, 1987

Related U.S. Application Data

[62] Division of Ser. No. 642,321, Aug. 20, 1984, abandoned.

[30] Foreign Application Priority Data

Dec. 27, 1983 [JP] Japan .............................. 58-244596
Jan. 11, 1984 [JP] Japan .................................. 59-3149

[51] Int. Cl.$^4$ ............................................. H01M 2/14
[52] U.S. Cl. ..................................... 429/34; 429/251; 429/253; 429/255
[58] Field of Search ............... 429/129, 142, 247, 249, 429/251, 252, 253, 255, 34; 156/242; 264/29.1, 29.5, 29.7, 105

[56] References Cited

U.S. PATENT DOCUMENTS

| | | | |
|---|---|---|---|
| 2,734,095 | 2/1956 | Mears et al. | 429/252 X |
| 2,882,331 | 4/1959 | Zenczak | 429/253 X |
| 3,297,638 | 1/1967 | Beaulieu | 429/253 X |
| 3,328,207 | 6/1967 | Beaulieu et al. | 429/253 |
| 4,207,129 | 6/1980 | Tadewald | 156/242 |
| 4,301,222 | 11/1981 | Emanuelson et al. | 429/251 |
| 4,359,510 | 11/1982 | Taskier | 429/248 X |

Primary Examiner—Anthony Skapars
Attorney, Agent, or Firm—Sughrue, Mion, Zinn, Macpeak & Seas

[57] ABSTRACT

The present invention relates to a method for producing a carbon sheet by baking and aims to produce a warpage-free carbon sheet having a high electric conductivity. The present invention is characterized by forming sheets comprising fibrous cellulose, thermosetting resin, and graphite powder and laminating the sheets, into which thermosetting resin is impregnated.

14 Claims, 1 Drawing Sheet

METHOD FOR PRODUCING A CARBON SHEET AND A FUEL CELL SEPARATOR

This is a division of application Ser. No. 642,321, filed Aug. 20, 1984, now abandoned.

BACKGROUND OF THE INVENTION

1. Field of the Invention

The present invention relates to a method for producing a carbon sheet. The present invention also relates to a fuel cell separator.

2. Description of the Prior Art

A carbon sheet, especially a fuel cell separator, is conventionally produced by using, as the starting materials, a thermosetting resin, such as phenol resin or furan resin, and graphite powder and by using one of the following processes:

(1) The A component is shaped into the form of a sheet and then is cured and baked.

(2) The A component and the B component are blended together, are shaped into the form of a sheet, and are cured.

(3) The A component and the B component are blended together, are shaped into the form of a sheet, are cured, and then are baked.

The A component and the B component are the thermosetting resin and the graphite powder, respectively.

The electric conductivity of the product obtained by the method (2) is low.

It is difficult in the methods (1) and (3) to remove the volatile matter contained in the shaped bodies therefrom, and therefore the shaped bodies are liable to crack during the curing and baking steps, especially during the curing step. As a result, the yield is low in the methods (1) and (3). If the removal of the volatile matter is a low-level removal, crack formation can be prevented but the gas tightness of the product may be impaired.

Since baking is not carried out in the method (2), the method (2) is economically advantageous. However, the electric conductivity of the product is not sufficiently satisfactory for it to be used as fuel cell separators since the thermosetting resin is not carbonized.

Figure 1:
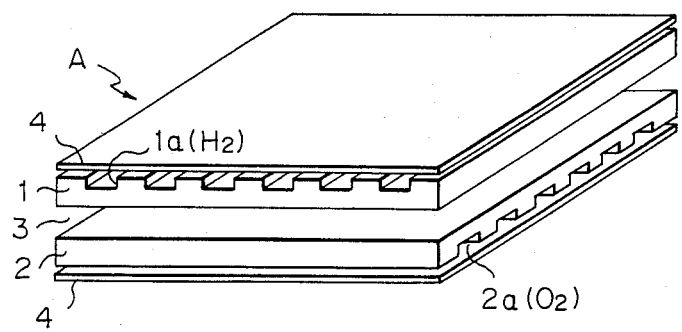
FIG. 1 shows a unit cell of a fuel cell.

The fuel cell is described with reference to FIGS. 1 and 2.

The fuel cell is a galvanic cell which directly converts the oxidation reaction of fuel to electric energy. In the fuel cell, the oxidation reaction of fuel proceeds electrochemically and the accompanying change in the free energy is directly converted to electric energy. The fuel can be $H_2$ gas and the oxidizer can be $O_2$ gas (FIG. 1). In the fuel cell using the electrochemical reaction between $H_2$ and $O_2$, a phosphate solution 3 is filled between the electrodes 1 and 2, and a flexible sheet (not shown) forms a container for holding the electrodes 1 and 2 and the phosphate solution 3 therein. The electrodes 1 and 2 must be porous to allow permeation of the phosphate solution 3 therein. A catalyzer, such as Pt, is carried on the porous structure of the electrodes 1 and 2. The surface of the electrodes 1 and 2, which surface is opposite to the surface in contact with the phosphate solution 3, is provided with grooves 1a and 2a. The $H_2$ and $O_2$ gases are passed along the grooves 1a and 2a, respectively, which are covered by the separators 4. The reaction between the $H_2$ and the $O_2$ is performed in the presence of the catalyzer, e.g., Pt, with the phosphate solution 3 acting as an intermediary only.

Figure 2:
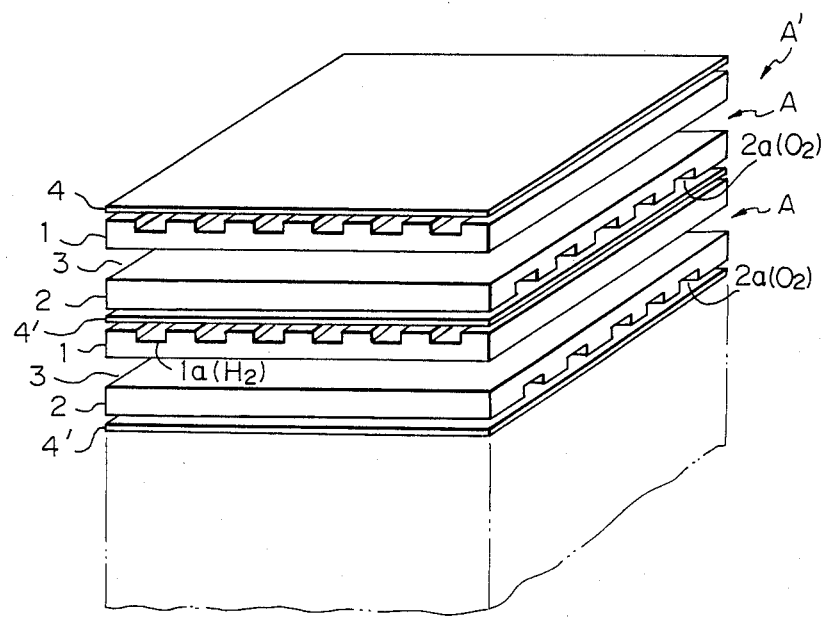
FIG. 2 shows unit cells connected in series.

Since the voltage of the single unit cell A (FIG. 1) is low, a plurality of unit cells A is connected in series as shown in FIG. 2 to form a layered cell A'.

The fuel cell is operated at approximately 200° C. Since $H_2$ gas and $O_2$ gas are flown over the upper and lower sides of the separators 4, respectively, the mixing of these gases is disadvantageous for the efficiency of a fuel cell.

Accordingly, the fuel cell separators 4 must have the following properties:

(a) The separators 4 must have a gas tightness so that the $H_2$ and $O_2$ gases do not permeate therethrough under any operating condition of the fuel cell.

(b) The separators 4 must have a high electric conductivity and be thin, e.g., from 0.5 to 2 mm, so as to allow effective power withdrawal therefrom.

(c) The separators 4 must be free of warpage and have a strength of a certain degree.

(d) The separators 4 must be corrosion-resistant against, for example, the phosphate solution (conventional metals are inappropriate as the separators 4).

(e) The separators 4 must not be expensive (Pt, Au, and other precious metals are highly corrosion-resistant but are expensive. Glassy carbon meets the requirements of (d) and (e)).

(f) The separators must have a large surface area, such as a square shape, of from 30 to 40 cm × from 30 to 40 cm.

It is difficult to produce by any one of the methods (1) through (3) warpage-free separators having a large surface area, as is described in, for example, "Ceramics" Vol. 4, No. 4, page 44 (1969).

It is also difficult by either of the methods (1) and (2) to provide the baked products with a resistivity of $10^{-1}$ $\Omega \cdot cm$ or less.

Japanese Unexamined Patent Publication No. 56-134565 discloses the lamination of a paper sheet and a resin sheet and the carbonization of the laminate body by baking. The product of the method of this publication is not appropriate for use as a fuel cell separator.

SUMMARY OF THE INVENTION

It is an object of the present invention to remove the disadvantages of the conventional method for producing a carbon sheet and to provide a method in which thermal shrinkage of and crack formation in the shaped bodies during baking are eliminated and in which the electric conductivity of the carbon sheet is considerably enhanced.

It is another object of the present invention to provide a fuel cell separator which meets the above-mentioned requirements and, especially, which has a high electric conductivity, is free of warpage, and has a high strength.

In accordance with the objects of the present invention, there is provided a method for producing a carbon sheet, comprising the steps of:

forming sheets comprising thermosetting resin and fibrous cellulose;

laminating the sheets;

curing the thermosetting resin; and baking the sheets, in which the thermosetting resin is cured.

DESCRIPTION OF THE PREFERRED EMBODIMENTS

According to an embodiment of the present invention, the method for producing a carbon sheet further comprises a step of impregnating the thermosetting resin into fibrous cellulose paper sheets to form sheets.

The sheets mentioned can further comprise carbon fillers. In addition, according to another embodiment of the present invention, the method for producing a carbon sheet further comprises the steps of:

preparing fibrous cellulose paper sheets and impregnating the thermosetting resin and the carbon fillers into the fibrous cellulsoe paper sheets to form sheets.

According to a further embodiment of the present invention, the method for producing a carbon sheet further comprises the steps of:

incorporating carbon fillers and fibrous cellulose into thermosetting resin diluted with an organic solvent;

mixing the graphite powder, the fibrous cellulose, and the thermosetting resin; and molding the mixture of carbon fillers, fibrous cellulose, and thermosetting resin into sheets.

The fuel cell separator according to the present invention consists of a carbon sheet produced by the methods mentioned above.

The fibrous cellulose consists of fibers having a high content of cellulose and suppresses, during the curing and baking steps, the formation of cracks and warpage of the sheets so that a carbon sheet which is suitable as a fuel cell separator can be produced at a high yield.

The fibrous cellulose enhances the strength of the sheets and the product and makes handling of them easy. The enhancement of the strength of the product seems to result from the shape of the fibrous cellulose carbonized in the product, that is, the fibrous shape of the cellulose seems to be maintained in the product. The fibrous cellulose may be short fibers, such as chopped yarn, cut fibers from a strand or wave-form fiber, or fibers obtained by immersing filter paper in water and mixing it with a mix muffler or a mixer for home use. The fibrous cellulose is randomly oriented during the mixing so that the sheets are not anisotropic. The cellulose fibers are preferably from 0.2 mm to 10 mm long. If the cellulose fibers are longer than 10 mm, mixing with resin becomes difficult and the fibers can be cut. On the other hand, if the cellulose fibers are shorter than 0.2 mm, their effect of enhancing electric conductivity and suppressing warpage is not appreciable.

The amount of fibrous cellulose is preferably approximately 10% or more based on the volume of the sheets. If, however, such amount exceeds 50%, the gas tightness of the product becomes poor.

The fibrous cellulose is preferably dried prior to mixing it with the other ingredients of the sheets. In this case, the water is removed from the sheets. The water removal improves the mutual wettability of the fibrous cellulose and the thermosetting resin and thus smoothens the impregnation of the thermosetting resin into the fibrous cellulose. Drying may be carried out by additionally heating the fibrous cellulose, provided that its strength is not impaired. Heating may be carried out to preliminarily shrink the fibrous cellulose and hence to reduce the shrinkage amount during the curing step. As a result, the shrinkage amount of the fibrous cellulose and that of the thermosetting resin are well balanced during baking, and, hence, crack formation can be lessened and the gas tightness of the product can be enhanced. The heating temperature is preferably from 100° C. to 250° C., more preferably from 120° C. to 250° C.

When fibrous cellulose paper sheets are used, they are, for example, sheets of kraft paper.

The thermosetting resin used in the method of the present invention may be phenol resin or furan resin. Phenol resin includes modified resin with dryoil, such as tungoil or linseed oil.

When a solvent is used in the method according to the present invention, it is, for example, acetone, ethyl alcohol, or another organic solvent. The amount of solvent is preferably from 20 to 200 volumes based on 100 volumes of thermosetting resin. Within this range of the solvent, the wettability of the thermosetting resin to the fibrous cellulose and the carbon fillers can be so enhanced that the gas tightness becomes high. In addition, the strength of the product becomes high due to improvement in the dispersion of the carbon fillers in the sheets.

The amount of thermosetting resin is preferably from 40% to 80% by weight of the sheets. If this amount is used, the solvent which dilutes the thermosetting resin is not contained therein. If the amount of thermosetting resin is less than 40%, the glass carbon of the product does not have a high denseness and, hence, the gas tightness of the product is impaired. On the other hand, if the amount of thermosetting resin is more than 80%, cracks are liable to generate during the baking step due to the escape of the volatile matter.

Separate sheets of fibrous cellulose may be dipped into the thermosetting resin, which may be diluted with a solvent. The sheets of fibrous cellulose are then dried, laminated, and bonded. During the bonding steps, the thermosetting resin is cured, and the so-obtained sheets are laminated and subjected to curing. The sheets which are subjected to baking may be commercially available electric insulative laminate boards, provided that they comprise fibrous cellulose.

The graphite powder enhances the electric conductivity of the product and provides the product with a high shape stability since the graphite suppresses shrinkage of the sheets during baking. The graphite powder need not be composed of 100% graphite although a high precentage of graphite is preferred for electric conductivity. Graphite powder tends to decrease the gas tightness of the product.

However, when graphite powder having a fine size, e.g., more than 80% of the particles being −200 mesh, or being contained in an amount of from 5% to 45% by weight of the sheets is used, the gas tightness is acceptable.

Carbon fillers, such as graphite powder, or carbon fiber may be incorporated into the sheets used in the laminating method, thereby enhancing the strength and electric conductivity of the product. In this case, the fibrous cellulose paper sheets comprising carbon fillers maybe prepared or manufactured and then are impregnated with thermosetting resin. The fibrous cellulose paper sheets are then dried and laminated, and the thermosetting resin is cured. Preferably, the laminate body is hot-pressed during the curing step, e.g., during the curing step, the laminate body is sandwiched between graphite or stainless steel plates and is subjected to a static pressure in the range of from approximately 1 kg/cm$^2$ to 200 kg/cm$^2$ over a period of from 10 minutes to 20 hours. The method for directly incorporating carbon fillers into the fibrous cellulose sheets can drastically enhance the electric conductivity of the product, while carbon which is first added to the thermosetting resin and then impregnated into the cellulose paper sheets cannot appreciably enhance the electric conductivity of the product. In addition, it is easy by the method using carbon fillers as described above to produce a product having 2,000 kg/cm² of bending strength. Carbon fillers tend to decrease the gas tightness of the product, but such a decrease can be effectively prevented by making the content of the carbon fillers not more than 40% by weight based on the weight of the fibrous cellulose paper sheets.

The fibrous cellulose, graphite powder, and thermosetting resin can be mixed with a pressure mixer, a Banbury mixer, a roll mixer, or the like. During the mixing of the ingredients, the ingredients may not be heated or may be somewhat heated to lessen the viscosity of the thermosetting resin, depending upon the kind of thermosetting resin. The mixture is molded by compression-molding, roll-molding, injection-molding, transfer-molding, or the like. The obtained sheets have, for example, a thickness of from 0.5 mm to 3 mm.

The sheets of the methods according to the present invention are baked to carbonize their ingredients. The thermosetting resin contained in the sheets is preferably cured prior to the baking step. Baking is usually carried out at a temperature of from 600° C. to 1200° C. in a non-oxidizing atmosphere. The laminate sheets are sandwiched between graphite or stainless steel sheets and are heated to a baking temperature. Baking may be carried out twice in separate furnaces. If the second baking temperature is higher than the first baking temperature, the electric conductivity of the product becomes high. The rate of temperature elevation up to the baking temperature is preferably slow, e.g., 3° C./hr or less. The temperature elevation rate and the furnace atmosphere at a stage where the temperature is elevated from 230° C. to 360° C. is important for the strength of the product, presumably because in a temperature range of from 230° C. to 360° C. the chemical bond of the thermosetting resin of the sheets greatly changes. The temperature of the laminate sheets is preferably enhanced at a rate of 1.5° C./hr or less, and the furnace atmosphere is preferably a mixed gas atmosphere of inert gas and oxygen gas having, e.g., a partial pressure of from 0.05 to 0.3 atm when the temperature is elevated from 230° C. to 360° C. If the temperature-elevation rate is considerably higher than 1.5° C./hr, foaming occurs and the strength of the product is drastically lessened. When the temperature is elevated from 360° C. to the baking temperature, the temperature-elevation rate can be from 5° C. to 10° C./hr and the furnace atmosphere may be an inert gas atmosphere, as in the conventional manner.

The product obtained by the method of the present invention can have a gas permeability of $10^{-6}$ cm²/sec or less (N₂ gas, 1 atm, and room temperature), a resistivity of 0.05 Ω·cm or less, preferably 0.005 Ω·cm or less, and a bending strength of 1,200 kg/cm² or more.

The present invention is hereinafter explained with reference to the examples.

EXAMPLE 1

Phenol resin, ethyl alcohol, synthetized graphite powder, and fibrous cellulose were admixed in the proportions given in the following table.

TABLE 1

|  | Phenol Resin | Ethyl Alcohol | Graphite Powder | Fibrous Cellulose |
|---|---|---|---|---|
| Run No. 1 | 50% | Equal Volumes of Resin | 30% | 20% |
| Run No. 2 | 70% | Double Volume of Resin | 20% | 10% |
| Run No. 3 | 50% | — | 30% | 20% |
| Comparative Run No. 4 | 70% | — | 20% | 10% |

The phenol resin was a commercially available phenol resin produced by Showa Union Gosei under the name of BXL-274 and had a viscosity of 30,000 cps at room temperature. The synthetized graphite powder had a size of −200 mesh at 92%. The fibrous cellulose was obtained by dipping filter paper into water and unravelling the filter paper therein, followed by drying at 100° C. for 3 hours. The above-described ingredients were mixed with a Henschel mixer (a mixer having high-speed stirring blades) for 10 minutes at room temperature. A paste-form mixture was obtained and was maintained at a temperature of 100° C. for 1 hour by means of a hot-air drier so as to remove the solvent, i.e., the ethyl alcohol, and age the phenol resin. The mixture was finely crushed and was molded with a metal die into sheets 1.5 mm in thickness, 300 mm in width, and 300 mm in length.

The sheets were sandwiched between graphite sheets and were heated to 1,000° C. at a rate of 3° C./hr in a non-oxidizing atmosphere. Baking was carried out at 1,000° C. in the non-oxidizing atmosphere. The properties of the products are given in Table 2.

TABLE 2

|  | Bulk Density (g/cm³) | Bending Strength (kg/cm²) | Resistivity (Ω-cm) | Gas Permeability (N₂, 1 atm, Normal Temperature) (cm²/sec) |
|---|---|---|---|---|
| Run No. 1 | 1.65 | 1300 | 0.002 | $3.1 \times 10^{-7}$ |
| Run No. 2 | 1.67 | 1380 | 0.002 | $9.5 \times 10^{-8}$ |
| Run No. 3 | 1.62 | 540 | 0.004 | $3.1 \times 10^{-5}$ |
| Run No. 4 | 1.65 | 650 | 0.004 | $9.9 \times 10^{-5}$ |

EXAMPLE 2

The following ingredients were used to provide a mixture:
Furan resin (produced by Hitachi Kasei Kabushiki Kaisha, viscosity 10 cps) 55%
Synthetized graphite powder 25%
Filter paper for industrial use (unravelled with water and dried at 100° C. for 3 hours) 20%

In addition to these ingredients, 0.1 weight parts of a curing agent based on 100 parts of the ingredients and a half volume part of acetone based on the volume of furan resin were used as the starting materials (Run No. 5). In Run No. 6, the same starting materials as those of Run No. 5, except for the acetone, were used.

The starting materials were mixed with a Henschel mixer, and the obtained mixture was further mixed for 1 minute with a roll mixer, the roll temperature of the mixer being 90° C. During the mixing with the roll mixer, the excessive acetone was removed from the mixture of Run No. 5. The obtained mixture in a paste form was shaped by roll-molding into sheets 1.0 mm in thickness and 300 mm in width. The sheets were laminated and baked as in Example 1.

TABLE 3

| | Bulk Density (g/cm³) | Bending Strength (kg/cm²) | Resistivity (Ω-cm) | Gas Permeability (cm²/sec) |
| --- | --- | --- | --- | --- |
| Run No. 5 | 1.63 | 1250 | 0.003 | $7.1 \times 10^{-8}$ |
| Run No. 6 | 1.55 | 650 | 0.004 | $5.0 \times 10^{-6}$ |

EXAMPLE 3

Ten sheets of kraft paper were dipped into phenol resin dissolved in ethyl alcohol. After pulling the kraft paper from the phenol resin, the kraft paper was dried at 80° C. for 1 hour. The ten sheets of kraft paper were laminated, and hot-pressing for curing the phenol resin was carried out at 160° C., 150 kg/cm², and a 10-minute time period. The so-produced laminate sheet 30 mm square and 1.5 mm in thickness was sandwiched between graphite plates so as to prevent the bending thereof. The laminate sheet was heated from room temperature to 230° C. at a rate of 40° C./hr, from 230° C. to 360° C. at a rate of 1.4° C./hr in $N_2$ atmosphere containing 0.2 atm of oxygen, and from 360° C. to 1100° C. at a rate of 50° C./hr. Baking was carried out in $N_2$ atmosphere.

The obtained carbon sheet exhibited a glass state and the following properties: bulk density: 1.52 g/cm³, bending strength: 1,600 kg/cm², resistivity: 0.006 Ω·cm, and permeability: $6.2 \times 10^{-10}$ cm²/sec ($N_2$ gas, 1 atm, and room temperature).

EXAMPLE 4

Ten sheets of paper were manufactured, each sheet containing 50% by weight of fibrous cellulose, 30% by weight of graphite powder 44 μm or less in grain size, and 20% by weight of 20 mm-long carbon fiber. Phenol resin (produced by Showa Kobunshi Kabushiki Kaisha under the name of BRS-324) was impregnated into the above paper at an amount of 60% by weight after drying. The resin-impregnated paper was dried at 80° C. for 1 hour. The ten sheets of paper were laminated, and hot-pressing for curing the phenol resin was carried out at 160° C., 150 kg/cm², and a 10-minute time period. The so-produced laminate sheet 30 mm square and 1.5 mm in thickness was sandwiched between graphite plates so as to prevent the bending thereof. The laminate sheet was heated from room temperature to 230° C. at a rate of 20° C./hr, from 230° C. to 360° C. at a rate of 1.0° C./hr in $N_2$ atmosphere containing 0.09 atm of oxygen, and from 360° C. to 1000° C. at a rate of 10° C./hr. Baking was carried out in $N_2$ atmosphere.

The obtained carbon sheet exhibited a glass state and the following properties: bulk density: 1.55 g/cm³, bending strength: 2120 kg/cm², resistivity: 0.002 Ω·cm, and permeability: $2.5 \times 10^{-10}$ cm²/sec ($N_2$ gas, 1 atm, and room temperature).

EXAMPLE 5

Seven sheets of paper were manufactured, each sheet containing 75% by weight of fibrous cellulose, 20% by weight of grahite powder 44 μm or less in grain size, and 25% by weight of 60 mm-long carbon fiber. The same phenol resin as in Example 4 was impregnated into the above paper at an amount of 70% by weight after drying. The resin-impregnated paper was dried at 80° C. for 1 hour. The seven sheets of paper were laminated, and hot-pressing for curing the phenol resin was carried out at 160° C., 150 kg/cm², and a 10-minute time period. The so-produced laminate sheet 600 mm square and 1.0 mm in thickness was sandwiched between graphite plates so as to prevent the bending thereof. The laminate sheet was heated from room temperature to 230° C. at a rate of 40° C./hr, from 230° C. to 360° C. at a rate of 1.4° C./hr in $N_2$ atmosphere containing 0.02 atm of oxygen, and from 360° C. to 1100° C. at a rate of 50° C./hr. Baking was carried out in $N_2$ atmospehre.

The obtained carbon sheet exhibited a glass state and the following properties: bulk density: 1.51 g/cm³, bending strength: 2410 kg/cm², resistivity: 0.003 Ω·cm, and permeability: $6.2 \times 10^{-10}$ cm²/sec ($N_2$ gas, 1 atm, and room temperature).

We claim:

1. A fuel cell separator having a gas permeability of $10^{-6}$ cm²/sec or less using nitrogen gas, at one atmosphere and at room temperature, a resistivity of 0.05 Ω·cm or less, and a bending strength of 1,200 kg/cm² or more, produced by a method comprising the steps of:
   forming sheets comprising thermosetting resin and fibrous cellulose;
   laminating said sheets;
   curing the thermosetting resin; and
   baking said sheets at a temperature of 600° C.–1200° C. in a non-oxidizing atmosphere thereby converting the thermosetting resin into carbon.

2. A fuel cell separator according to claim 1, wherein said forming of said sheets comprises impregnating said fibrous cellulose paper sheets with said thermosetting resin to form said sheets.

3. A fuel cell separator according to claim 1, wherein said sheets further contain carbon fillers.

4. A fuel cell separator according to claim 3, wherein said forming of said sheets comprises
   preparing fibrous cellulose paper sheets and
   impregnating said fibrous cellulose paper sheets with said thermosetting resin and said carbon filler to form said sheets.

5. A fuel cell separator according to claim 3, wherein said forming of said sheets comprises;
   mixing graphite as said carbon fillers with said fibrous cellulose and said thermosetting resin diluted with an organic solvent; and
   molding the mixture of graphite powder, fibrous cellulose, and thermosetting resin into said sheets.

6. A fuel cell separator according to claim 1, 2, or 3, wherein the length of the fibrous cellulose is from 0.2 mm to 10 mm.

7. A fuel cell separator according to claim 1, 2, or 3, wherein the amount of fibrous cellulose is approximately 10% to 50% based on the volume of the sheets.

8. A fuel cell separator according to claim 1, 2, or 3, wherein the fibrous cellulose is a dried fibrous cellulose.

9. A fuel cell separator according to claim 8, wherein the dried fibrous cellulose is heated to a temperature of from 100° C. to 250° C. for the drying thereof.

10. A fuel cell separator according to claim 5, wherein the solvent of the thermosetting resin is present in an amount of from 20 to 200 volumes based on 100 volumes of thermosetting resin.

11. A fuel cell separator according to claim 1, 2, or 3, wherein the amount of thermosetting resin is from 40% to 80% by weight of the molded sheet.

12. A fuel cell separator according to claim 3, wherein said carbon fillers consist of graphite powder where more than 80% of the powder particles have a particle size of −200 mesh and the graphite powder is present in an amount of from 5% to 45% by weight of the sheets.

13. A fuel cell separator according to claim 4, wherein the fibrous cellulose paper sheets are sheets of kraft paper.

14. A fuel cell separator according to claim 4, wherein the content of the carbon fillers is not more than 40% by weight based on the weight of the fibrous cellulose paper sheets.

* * * * *